Nov. 11, 1930.  T. BROWN  1,780,900
CULTIVATOR WHEEL MOUNTING
Filed April 30, 1928  2 Sheets-Sheet 1
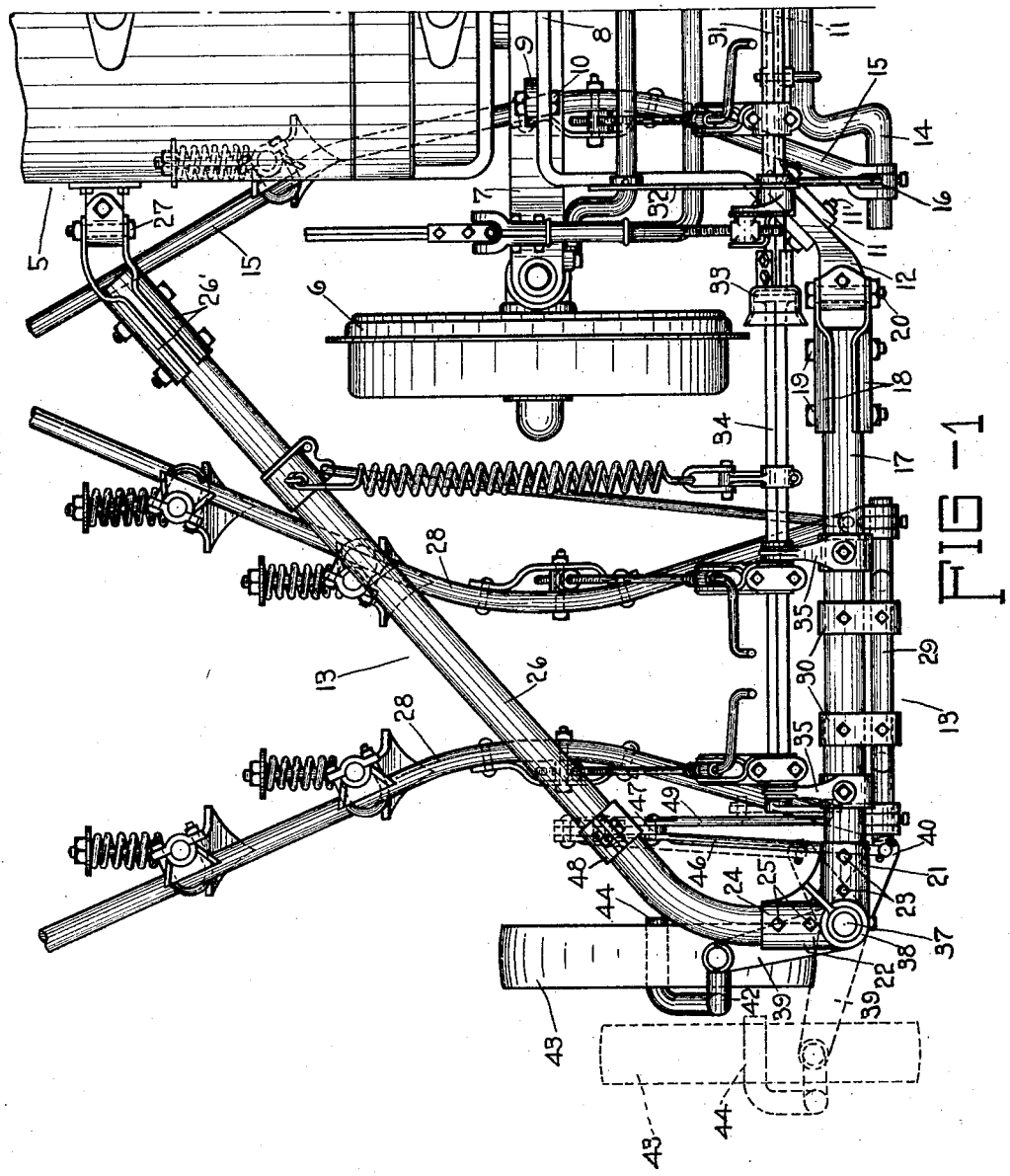
WITNESS
Walter Ackerman
INVENTOR
Theophilus Brown
BY Brown, Jackson, Boettcher & Dienner
ATTORNEYS

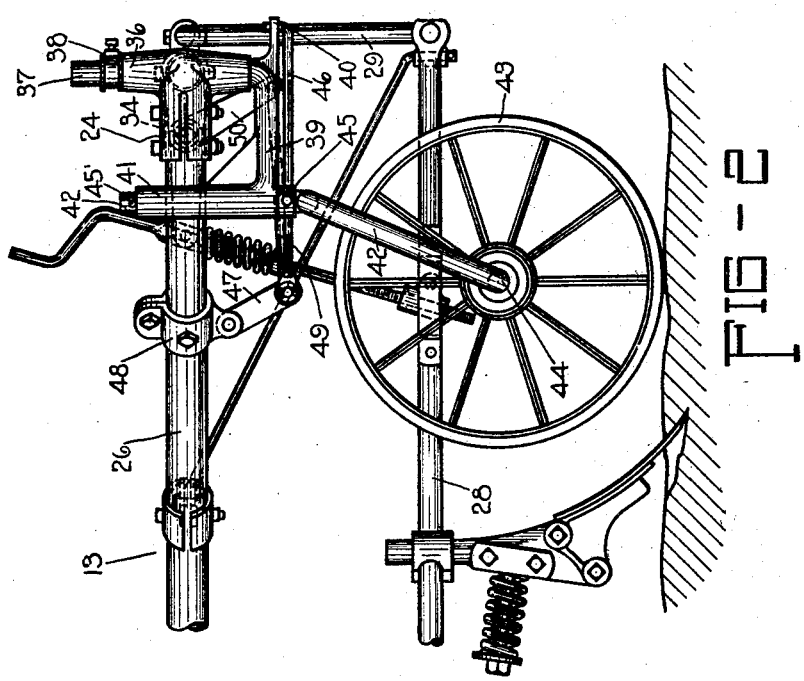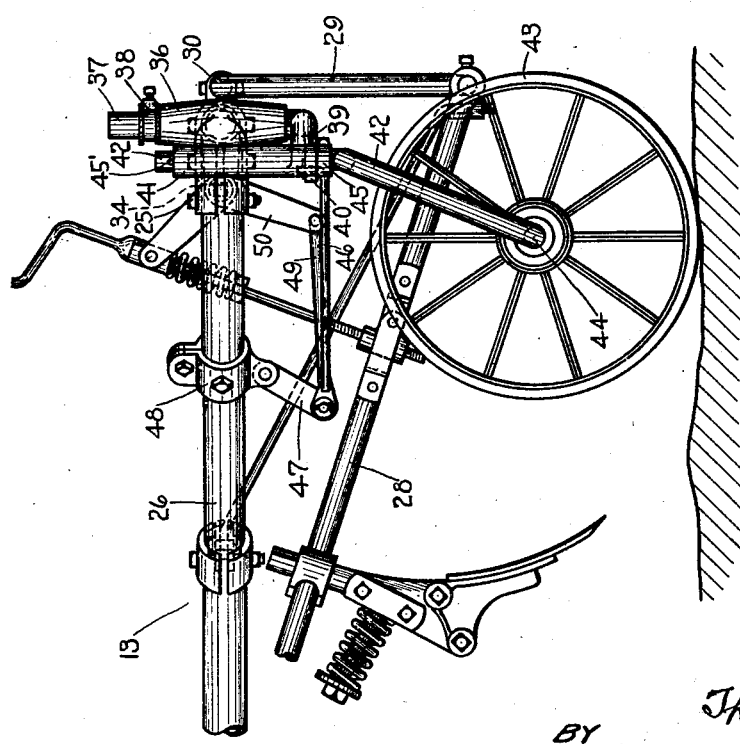

Patented Nov. 11, 1930

1,780,900

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

CULTIVATOR-WHEEL MOUNTING

Application filed April 30, 1928. Serial No. 273,872.

The present invention relates to wheel mountings for cultivators, having particular reference to three row cultivators of the type which are supported on, or are propelled from, the front end of a tractor. In implements of this general type, the cultivator rigs which cultivate the two outer plant rows are spaced outwardly from the sides of the tractor, being supported on frame extensions in the nature of outrigger frames. One practice of supporting these outrigger frames has been to pivotally connect the inner ends thereof to the main body of the implement or to the tractor, and to support the outer ends of said frames on caster wheels, thereby permitting each outrigger frame to rise and fall as its caster wheel passes over uneven ground so that the rig beams carried by said frame will maintain a substantially uniform cultivating depth as the implement passes over uneven ground.

It is with the mounting of these caster wheels on the outrigger frames that the present invention is primarily concerned. When the implement is traveling along the plant rows in a cultivating operation, these caster wheels should track along lines approximately midway between adjacent plant rows to each side of the implement so that these wheels will not strike and injure any of the plants. Such location of each caster wheel places it in comparatively close proximity to the outermost rig beams, and I have found that when the implement is turned sharply at the end of the field, the caster wheel at the inner side of the turn will frequently strike this rig beam, preventing free rotation of the wheel and hindering the turning of the implement.

The primary object of the present invention is to provide means for displacing these wheels outwardly from the adjacent rig beams when the implement is to be turned. A further object of the invention is to provide means for automatically effecting this outward displacement of the caster wheels when the rig beams are raised to their inoperative position, preparatory to turning at the end of the field. Such construction results in the wheels being shifted outwardly at the same time that the rig beams are raised, and shifted inwardly at the same time that the beams are lowered, thereby avoiding the necessity of any special operation being performed by the operator to effect the shifting of the wheels. Moreover, by such construction, I am enabled to derive the necessary power for shifting the wheels from the power lift mechanism which is usually employed to raise and lower the cultivator rigs.

When the caster wheels are shifted outwardly, as above described, they are so spaced from the adjacent rig beams that they can caster through practically an unlimited range of movement without striking the rig beams. Thus, if it is necessary to back the implement to any appreciable distance, the caster wheels are free to swivel completely around to a reversed position without striking the rig beams.

While the invention has been devised primarily for these three-row motor cultivators, it will be understood that its use is not limited thereto but comprehends other implements and also other types of vehicles where the tread spacing between wheels or the position of a caster wheel or a steerable wheel is to be varied.

Other objects and advantages of the invention will appear in the following description of a preferred embodiment thereof. In the accompanying drawings illustrating such embodiment:

Fig. 1 is a plan view of one side of a conventional type of three row cultivator equipped with my improved wheel supporting means for the outrigger frames, a portion of the tractor by which the cultivator is driven also being shown.

Fig. 2 is a fragmentary side elevation of a portion of the outrigger frame with my improved supporting means attached thereto, and illustrating the position of the parts when the rigs are in working or lowered position; and Fig. 3 is a similar view illustrating the position of such parts when the rigs are in transport or raised position.

Referring to the drawings, 5 indicates the front portion of the tractor, which may be of any conventional type adapted for use in connection with this type of cultivator. 6 indicates one of the front wheels of the tractor, said wheel 6 being mounted on the end of an arched axle 7, which extends transversely of the tractor and is capable of lateral rocking movement.

The center rig-supporting frame comprises a U-shaped bracket 8, one-half of which is shown in Fig. 1, the other half being symmetrical therewith, which bracket is secured to the arched axle 7 by means of ears 9 formed on the top surface of the axle, bolts 10 passing through said frame and said ears. The legs of the bracket 8 extend forwardly and have their ends bent outwardly at an angle of approximately 45° as shown, and a cross brace 11 connects the bent ends of this bracket, said cross brace being secured to said brackets by bolts 11'. Inserted between the end of the bracket 8 and the end of the cross brace 11, and secured therebetween by the bolts 11' (see Fig. 1) is a front supporting bracket 12 for the outer rig-supporting frame, designated 13 in its entirety. 14 indicates a bail which supports the center cultivator rigs, said bail being suitably connected to the cross brace 11 of the bracket 8. This bail extends downwardly and has its ends turned outwardly horizontally, as shown, to which ends are pivotally secured the front ends of the center cultivator rigs 15. The lower end of the bail is held against fore and aft movement by a brace 16 which is connected at its front end to the bail and at its rear end to a portion of the bracket 8 or to the arched axle 7.

The outer rig-supporting frame comprises a transversely extending front frame bar 17 which is pivotally connected to the bracket 12 by means of suitable plates 18 secured to said transverse bar by bolts 19, said plates being pivotally connected to the bracket 12 by a pivot bolt 20, as shown in Fig. 1. The outer end of said transverse bar 17 is fitted into a sleeve 21 in the caster wheel bracket 22, being secured therein by bolts 23. Extending rearwardly and at a right angle to the sleeve 21, and forming a part of this bracket 22 is a similar sleeve 24, and in this sleeve 24 is secured by bolts 25 the forward end of the rear member 26 of the outer rig-supporting frame 13. This rear member 26 of the supporting frame extends diagonally rearwardly toward the tractor, to the frame of which it is pivotally connected by suitable plates 26' engaging over a pivot bolt 27 carried by a bracket projecting from the tractor.

The outer cultivator rig beams 28 are mounted on the horizontally extending outer ends of a bail 29 similar in construction to the bail 14. Said bail 29 is connected to the transverse bar 17 by means of suitable mounting members 30 (see Fig. 1).

The central rig beams 15 of the cultivator are raised and lowered by a suitable rock shaft 31 which is mounted in plates 32 suitably secured to the forwardly projecting arms of the bracket 8. This rock shaft 31 extends transversely of the machine, and each end thereof is provided with a square socket 33, one of which is shown in Fig. 1, which socket is in substantially the same fore and aft plane as the pivotal connection 20 of the front transverse bar 17.

An outrigger rock shaft 34 has universal joint movement in this socket and extends outwardly therefrom a sufficient distance so that the rig beams 28 of the outer cultivator rig may be suitably connected thereto. The outer portion of the rock shaft 34 is suitably supported in brackets 35 which extend rearwardly from the transverse bar 17. The several sections 31 and 34—34 of the rock shaft are operatively connected with the rig beams 15 and 28 respectively, in such manner that rocking movement of said shaft will raise and lower the rig beams between their cultivating positions and their transport positions. Such rocking movement of said shaft is effected by power lift mechanism which derives its operating energy from the engine of the tractor. The details of these rig lifting connections and of the power lift mechanism are clearly disclosed in my copending application Serial No. 128,929, filed August 13, 1926.

The mechanism thus far described relates to the general construction of a cultivator such as I have disclosed in my copending application and is not a part of the present invention except in-so-far as the elements thereof may cooperate with the arrangement hereinafter described.

Referring now to my improved means for mounting the caster wheel which supports the outer end of the outrigger frame 13, the caster wheel bracket 22 is provided with a vertically extending sleeve 36, in which is journaled a shaft 37, said shaft extending upwardly through said bearing sleeve and being held in place by a set screw collar 38, which is secured to said shaft and rests upon the upper end of the sleeve 36.

A shoulder on the lower portion of the shaft 37 bears against the lower end of the bearing sleeve. Two arms 39 and 40, preferably of different lengths, are formed integral with said shaft and extend outwardly therefrom in the same horizontal plane at an angle to each other, as shown in Fig. 2. The outer end of the longer arm 39 is provided with a vertically extending sleeve 41, in which is journaled the upright spindle portion of a caster wheel axle 42. This axle extends downwardly and around the outer rim of the caster wheel, such wheel being indicated at 43 and being mounted on the horizontally turned end 44 of said axle. The upper end of the vertical axle spindle 42 is held in the swinging bearing sleeve 41 by a cotter pin 45' and the lower portion of said spindle carries a collar 45 which bears against the bottom of the bearing sleeve. It will thus be seen that the lower end of the shaft 37 journaled in the sleeve 36 is connected with the wheel 43 through the arm 39, the sleeve 41, and the wheel spindle 42 which carries said wheel.

A link 46 is connected at one end to the outer end of the arm 40 and extends rearwardly therefrom, the opposite end of said link being pivotally connected to a short swinging arm 47, pivotally mounted on a clamp bracket 48, which is suitably secured to the rear member 26 of the outer rig-supporting frame. A second link 49 is also pivotally mounted at one end on the swinging arm 47, which link 49 extends forwardly therefrom and has its other end connected to an arm 50, which extends downwardly from the outrigger rock shaft 34, and to which shaft said arm 50 is fixedly secured so as to rock therewith. It will be seen from the above description that the lower end of the shaft 37 in addition to being connected with the wheel is also connected with the rock shaft 34 through the arm 40, the link 46, the swinging arm 47, the link 49, and the arm 50 secured to and extending downwardly from said rock shaft. This shaft 37, therefore, provides means mounted in the sleeve 36 which is not only connected with the wheel 43, as above described, but is also connected with the rock shaft and adapted to be operated thereby.

It will be understood that the caster wheels 43 at each side of the implement afford ground engaging supports for the outer ends of the two outrigger frames, such wheels causing these frames to swing upwardly and downwardly around the pivot centers 20 and 27 as the caster wheels pass over uneven ground, whereby the cultivating shovels on the laterally disposed rig beams 28 are maintained at a substantially uniform depth of cultivation.

The operation of the above described shifting means for the axle supporting devices of the caster wheels will now be described. When the rig beams are in lowered or working position, as shown in Fig. 2, the wheel 43 is running in a position close in to the outer rig beam 28 of the outer cultivator rig, as indicated in full lines in Fig. 1, corresponding to a line of travel approximately midway between the lateral row being cultivated and the next row spaced outwardly therefrom. In order to move the rigs to raised or transport position, the rock shaft 34 is revolved in a clockwise direction and through said rock shaft the arm 50, which is connected at its upper end on said rock shaft to move therewith, is swung rearwardly, moving the link 49 rearwardly. This rearward movement of the link 49 swings the lower end of the swinging arm 47 rearwardly. At the same time the link 46, which is connected to said swinging arm 47, is moved rearwardly and said link pulls the outer end of the arm 40 rearwardly. As the outer end of the arm 40 moves rearwardly, the outer end of the arm 39, which arm is formed integral with the arm 40 and extends at an angle thereto, is swung outwardly and forwardly, the arms 40 and 39 swinging around the axis of the shaft 37.

Thus the sleeve 41 which is mounted on the outer end of the arm 39, and in which sleeve the upper end of the axle 42 of the wheel 43 is mounted, is swung outwardly and forwardly away from the outer rig beam 28, carrying with it the wheel mounted on said axle. Thus said wheel is moved outwardly a sufficient distance so that it will have plenty of room to caster without the possibility of striking the outer rig beam 28, when the cultivator is turned at the end of a field. The caster wheel is shown in this outwardly displaced position in dotted lines in Fig. 1, and it will be observed that it has ample room to swivel completely around if the implement should be backed for any distance.

After the turn has been made, the cultivator rigs are lowered again into operative position by the rotation of the rock shaft in a counterclockwise direction, and as the rock shaft is revolved, the lower end of the arm 50 moves in a forward direction, drawing the link 49 and the swinging arm 47 forwardly. The link 46 is thereby moved forward, swinging the arm 40 in a forward direction, and the arm 39 is moved inwardly and rearwardly, drawing the sleeve 41 and the axle 42 mounted therein toward the frame of the machine, thus again bringing the wheel close in toward the outer rig beam 28 so that said wheel will not interfere with the outer plant row.

In the drawings I have shown only one-half of the entire cultivator, but it will be understood that the other half of the machine is of the same construction as that above described, and that the parts thereof operate in the same manner as those mentioned above.

I claim:

1. A cultivator comprising in combination, a frame, a supporting wheel therefor, cultivator rigs mounted on said frame, a rock shaft mounted on said frame and adapted to raise and lower said cultivator rigs, a sleeve mounted on said frame, a shaft rotatably mounted in said sleeve, a pair of arms formed integral with said shaft and extending at an angle to each other, one of said arms comprising a sleeve, an axle for said wheel mounted in said second named sleeve, and means connecting the other of said arms with said rock shaft whereby the movement of said rock shaft moves said wheel toward and from said frame simultaneously with the lowering and raising of said rigs.

2. A cultivator comprising in combination, a frame, a supporting wheel therefor, cultivator rigs mounted on said frame, a rock shaft mounted on said frame and adapted to raise and lower said cultivator rigs, a sleeve mounted on said frame, a shaft mounted in said sleeve, a pair of arms connected to said latter shaft and extending outwardly therefrom at an angle to each other, an axle for said wheel connected with one of said arms, a link connected with said other arm, and means connecting said link with said rock shaft whereby the movement of said rock shaft moves said wheel toward and from said frame simultaneously with the lowering and raising of said rigs.

3. In a cultivator, the combination of a frame, cultivating devices carried thereby, lifting mechanism for raising and lowering said cultivating devices, caster wheels supporting the outer ends of said frame and shiftable, and means for shifting said caster wheels inwardly and outwardly relatively to said frame operative by the actuation of said lifting mechanism.

4. In an agricultural implement comprising a motor, the combination of a frame, implement devices carried thereby, shiftable supporting wheels at the sides of said frame, and means actuated by said motor for shifting said wheels inwardly or outwardly relatively to said frame.

5. In an agricultural implement, the combination of a frame, power means for propelling said frame, implement devices carried by said frame, supporting wheels at the sides of said frame and movable relative thereto, a shaft adapted to be driven by said power means, and mechanism deriving power from said shaft and effective to vary the tread spacing between said wheels.

6. In a motor cultivator of the three row type, the combination with a tractor, of outrigger frames pivotally mounted on the tractor and extending laterally therefrom, cultivating rigs movably supported on said outrigger frames, caster wheels supporting the outer ends of said outrigger frames and movable relative thereto, a shaft adapted to be driven by the engine of the tractor and operatively connected for raising and lowering said cultivator rigs, and means actuated by said shaft for swinging said caster wheels inwardly or outwardly with respect to said frames.

7. In an agricultural implement, the combination with a main frame, of outrigger frames pivotally mounted on said main frame and extending laterally therefrom, earth working devices carried by said outrigger frames, caster wheels supporting the outer ends of said outrigger frames and movable relative thereto, and means for swinging said caster wheels inwardly or outwardly with respect to said outrigger frames.

8. In an agricultural implement, the combination with a tractor, of outrigger frames pivotally mounted on the tractor and extending laterally therefrom, implement devices carried by said outrigger frames, caster wheels supporting the outer ends of said outrigger frames and movable relative thereto, a shaft mounted on each of said outrigger frames, means connecting each of said shafts with the adjacent caster wheel, means actuated by said shafts for shifting said caster wheels inwardly or outwardly with respect to said frames, and means for actuating said shafts.

9. In a cultivator, the combination with a main frame, of outrigger frames pivotally mounted on said main frame and extending laterally therefrom, earth working devices carried by said outrigger frames, caster wheels supporting the outer ends of said outrigger frames, and movable relative thereto, and means mounted on said main frame for shifting said caster wheels inwardly or outwardly with respect to said outrigger frames.

10. In a cultivator, the combination with a main frame, of outrigger frames pivotally mounted on said main frame and extending laterally therefrom, caster wheels supporting the outer ends of said outrigger frames and movable relative thereto, and means mounted on each of said outrigger frames for displacing the castering axes of said wheels inwardly or outwardly with respect to said outrigger frames.

11. A cultivator comprising in combination, a frame, a supporting wheel for said frame movable laterally relative thereto, cultivator rigs movably mounted on said frame, a rock shaft mounted on said frame and adapted to raise and lower said cultivating rigs, a sleeve mounted on said frame, and means mounted in said sleeve and connected with said wheel and operative through said rock shaft for moving said wheel toward and from said frame simultaneously with the lowering and raising of said rigs.

12. A cultivator comprising in combination, a frame, a supporting wheel for said frame movable relative thereto, cultivator rigs movably mounted on said frame, a rock shaft mounted on said frame and adapted to raise and lower said cultivator rigs, a sleeve mounted on said frame, a shaft rotatably mounted in said sleeve and connected with said wheel, and means connecting said shaft with said rock shaft whereby the movement of said rock shaft moves said wheel toward and from said frame simultaneously with the lowering and raising of said rigs.

13. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a shaft rotatably mounted in said sleeve, a pair of arms formed integral with said shaft and extending at an angle to each other, means connecting one of said arms with said wheel, and means connecting the other of said arms with said rock shaft for moving said wheel toward and from said frame simultaneously with the lowering and raising of said rigs.

14. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a second shaft rotatably mounted in said sleeve, means connecting said second shaft with said wheel for moving said wheel laterally upon rotation of said second shaft, an arm mounted on said rock shaft to rock therewith, and means connecting said arm with said second shaft for rotating said second shaft whereby movement of said rock shaft moves said wheel toward and from said frame automatically with the lowering and raising of said rigs.

15. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a second shaft rotatably mounted in said sleeve, means connecting said second shaft with said wheel for moving said wheel upon rotation of said second shaft, and links connecting said rock shaft with said second shaft for rotating said shaft whereby the movement of said rock shaft moves said wheel toward and from said frame simultaneously with the lowering and raising of said rigs.

16. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a second shaft rotatably mounted in said sleeve, an axle for said wheel operatively connected with said second shaft, an arm connected with said second shaft and extending outwardly therefrom, and means connecting said arm with said rock shaft for moving said arm upon movement of said rock shaft whereby movement of said rock shaft moves said wheel toward and from said frame simultaneously with the lowering and raising of said rigs.

17. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a second shaft rotatably mounted in said sleeve, an axle for said wheel operatively connected with said second shaft and movable toward and from said frame by rotation of said shaft, an arm connected with said second shaft and extending outwardly therefrom, and links connecting said arm with said rock shaft whereby movement of said rock shaft moves said wheel toward and from said frame simultaneously with the lowering and raising of said rigs.

18. A cultivator comprising in combination, a frame, a supporting wheel for said frame movable laterally relative thereto, cultivator rigs movably mounted on said frame, a rock shaft mounted on said frame and adapted to raise and lower said cultivator rigs, a sleeve mounted on said frame, a second shaft rotatably mounted in said sleeve, an axle for said wheel operatively connected with said second shaft and movable toward and from said frame by rotation of said shaft, an arm connected with said second shaft and extending outwardly therefrom, an arm mounted on said rock shaft to rock therewith, and links connecting said second arm with said first mentioned arm for moving said first mentioned arm upon movement of said second arm whereby movement of said rock shaft moves said wheel toward and from said frame simultaneously with the lowering and raising of said rigs.

19. A cultivator comprising in combination, a frame, a supporting wheel for said frame movable laterally relative thereto, cultivator rigs movably mounted on said frame, a rock shaft mounted on said frame and adapted to raise and lower said cultivator rigs, and means connecting said rock shaft with said wheel and movable by movement of said rock shaft whereby as said rigs are raised said wheel is moved away from said frame, and as said rigs are lowered said wheel is moved toward said frame.

20. A cultivator comprising in combination, a frame, a supporting wheel for said frame movable laterally relative thereto, cultivator rigs movably mounted on said frame, a rock shaft mounted on said frame and adapted to raise and lower said cultivator rigs, and means connecting said rock shaft with said wheel whereby as said rigs are raised or lowered, said wheel is coincidently moved away from or toward said frame, said means comprising a series of links connected between said rock shaft and said wheel.

21. In a cultivator, the combination of a frame, cultivating devices movably carried thereby, a supporting wheel for said frame movable relative thereto, and a single actuating means for raising and lowering said cultivating devices and for displacing said wheel relatively to the frame and to the plant rows being cultivated.

22. In a cultivator, the combination of a frame, cultivating devices movably carried thereby, means for raising and lowering said cultivating devices, a caster wheel supporting a portion of said frame and movable relative thereto, and means for displacing said caster wheel inwardly or outwardly relatively to the frame and to the plant rows being cultivated simultaneously with the lowering and raising of said cultivating devices.

23. In a cultivator, the combination of a frame, vertically movable cultivating devices carried thereby, a supporting wheel for said frame movable relative thereto, and means for displacing said wheel relatively to the frame operative by the raising and lowering of said cultivating devices.

THEOPHILUS BROWN.

CERTIFICATE OF CORRECTION.

Patent No. 1,780,900.  Granted November 11, 1930, to

THEOPHILUS BROWN.

It is hereby certified that error appears in the printed specification of the above numbered patent requiring correction as follows: Page 4, line 27, claim 3, after the word "shiftable" insert the words relative thereto; and that the said Letters Patent should be read with this correction therein that the same may conform to the record of the case in the Patent Office.

Signed and sealed this 6th day of January, A. D. 1931.

(Seal)

M. J. Moore,
Acting Commissioner of Patents.